Sept. 6, 1927. E. SCHNEIDER Re. 16,734
APPARATUS FOR CONTROLLING THE FIRING AGAINST AERIAL OBJECTIVES
Original Filed Jan. 5, 1922 4 Sheets-Sheet 1
Fig. 1.
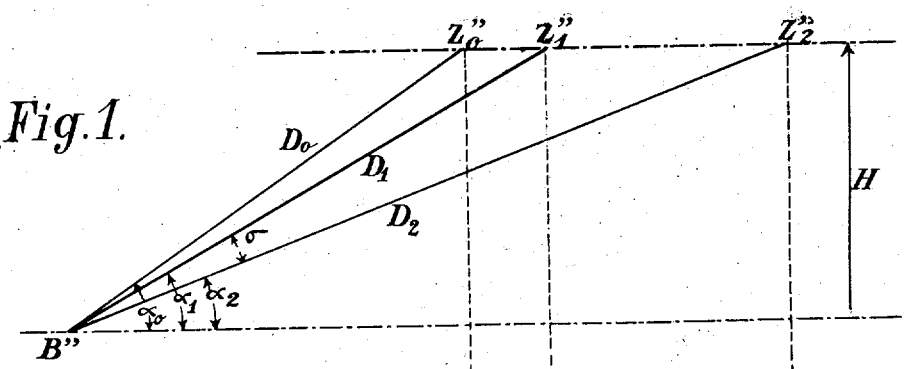
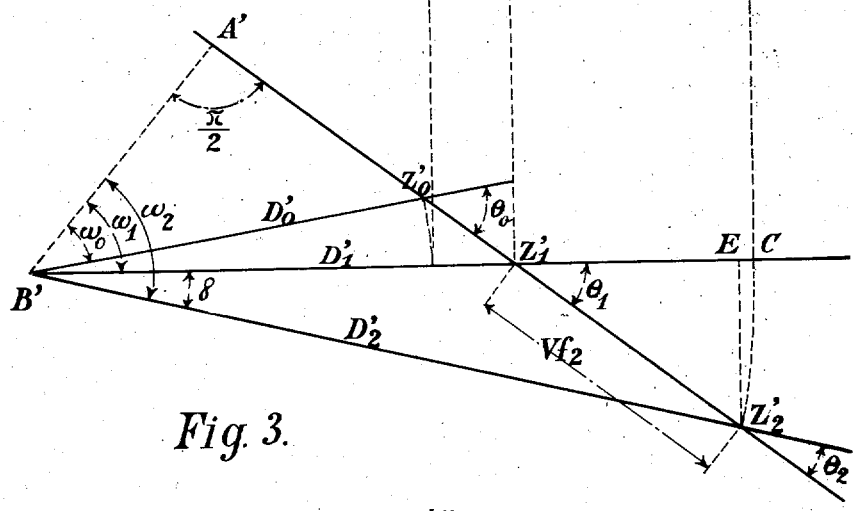
Fig. 3.
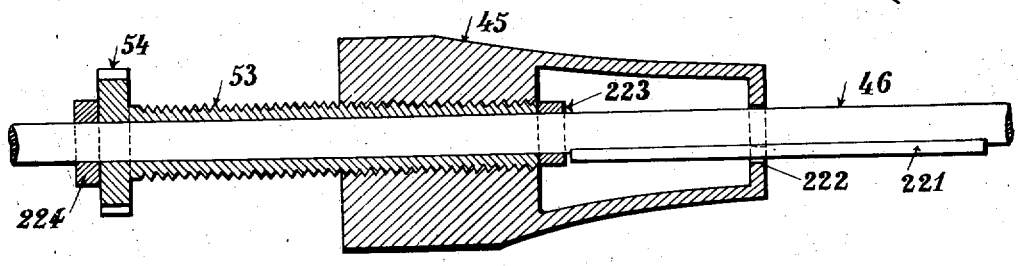
Inventor:-
Eugene Schneider
By Mann Cameron, Lewis & Parker
Attorneys Sept. 6, 1927. E. SCHNEIDER Re. 16,734

APPARATUS FOR CONTROLLING THE FIRING AGAINST AERIAL OBJECTIVES

Original Filed Jan. 5, 1922 4 Sheets-Sheet 2

Inventor:
Eugene Schneider
By Mauro, Cannon, Lewis & Hickam
Attorneys

APPARATUS FOR CONTROLLING THE FIRING AGAINST AERIAL OBJECTIVES
Original Filed Jan. 5. 1922 4 Sheets-Sheet 3
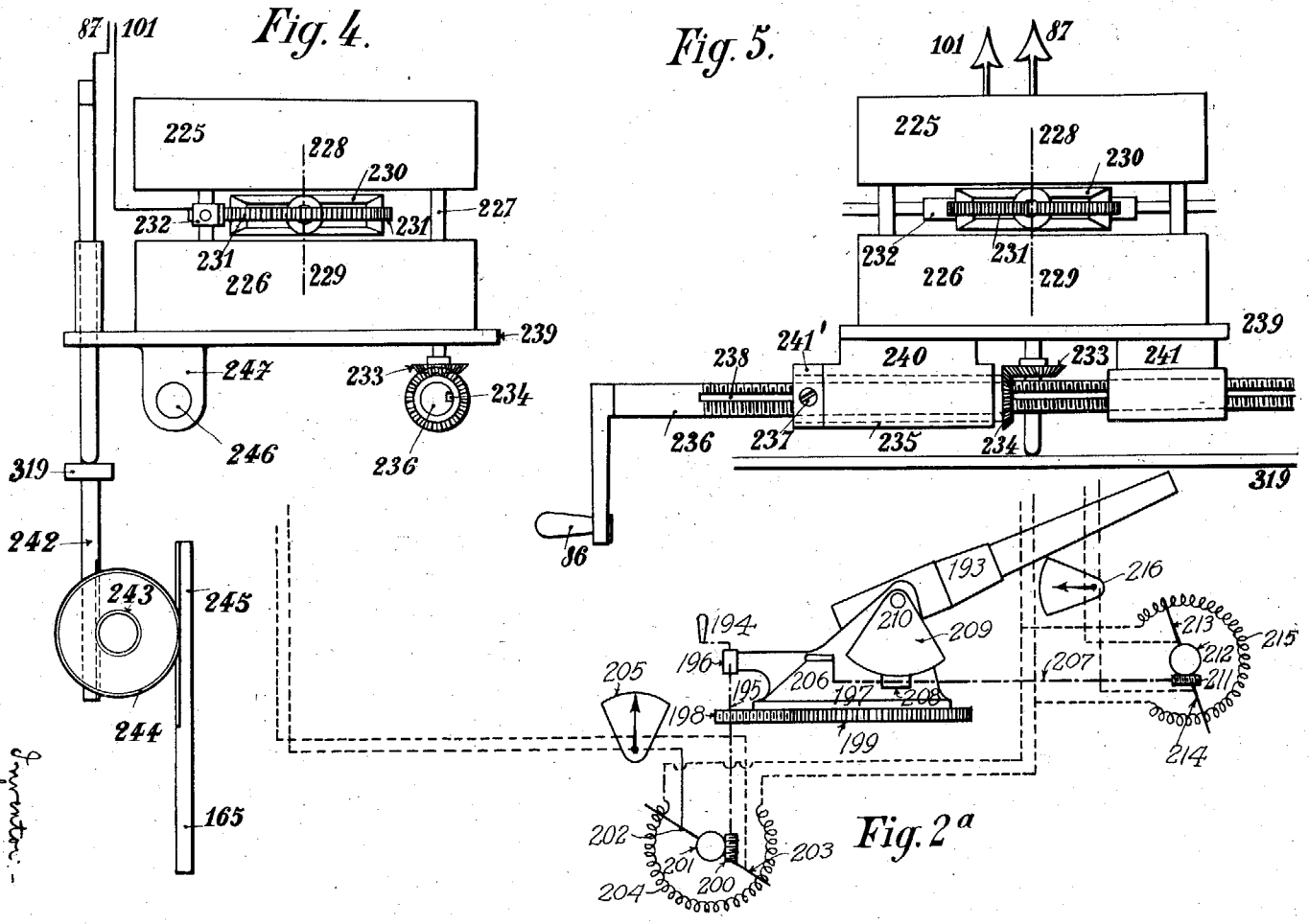
Inventor:-
Eugene Schneider
By Mauro, Cameron, Lewis & Perkins
Attorneys.

APPARATUS FOR CONTROLLING THE FIRING AGAINST AERIAL OBJECTIVES

Original Filed Jan. 5, 1922 4 Sheets-Sheet 4

Inventor
Eugene Schneider
By Mauro, Cameron, Lewis & Berkam
Attorneys

Reissued Sept. 6, 1927. Re. 16,734

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE, AND JOSEPH LOUIS ROUTIN, OF PARIS, FRANCE.

APPARATUS FOR CONTROLLING THE FIRING AGAINST AERIAL OBJECTIVES.

Original No. 1,576,367, dated March 9, 1926, Serial No. 527,275, filed January 5, 1922. Application for reissue filed August 10, 1926. Serial No. 128,485.

This invention relates to an apparatus for directing and controlling the fire of anti-aircraft guns against an aerial objective.

The problem of firing against aerial objectives has been generally explained in U. S. Patent No. 1,345,697, dated July 6, 1920, which discloses means for graphically obtaining the data necessary for directing the fire of anti-aircraft guns. After said data has been graphically obtained by the use of said means, it was necessary for certain members of the fire control party to transmit the same to the guns being controlled.

An object of the present invention is to provide an apparatus for directing and controlling the fire of anti-aircraft guns which comprises means for mechanically and electrically recording and compounding ballistic data, when actuated by members of the fire control party. It includes means, operatively connected with the aforesaid means, for transmitting directly to indicators located adjacent said gun or guns, this corrected data including windage corrections. The apparatus further includes means interposed between said indicators and the training and pointing mechanisms of the gun, or guns, whereby, when said gun, or guns, are laid to the proper angles of elevation and train, the pointers of said indicators will occupy certain predetermined positions.

When compared with devices of this type which have been heretofore proposed, the apparatus forming the subject matter of this invention has the following novel and advantageous characteristics:—

(1) It utilizes strictly exact formulæ which, when automatically translated into mechanical operations, constantly give the exact values of all elements necessary for directing the firing.

(2) It combines, in one body, an apparatus, that will be hereinafter referred to as a "corrector", which comprises all the necessary elements for directly and continuously determining the angles of azimuth and elevation through which the guns must be moved, or pointed, in order to take into account the movement of the objective and the speed and direction of the wind; the said elements are directly transmitted, electrically, to indicators mounted on, or adjacent, the guns, said indicators being operatively connected to members used for laying the gun in azimuth and elevation.

(3) It eliminates the personal equation which arises when the firing data is taken from a plotting board and transmitted by members of the fire control party to the guns.

The following advantages result from the above arrangement:

(*a*) Any error in the designation of the objective is avoided when, as generally happens, there is not one single enemy aeroplane but squadrons of aeroplanes.

(*b*) As the operators which have to operate the corrector are alone required to follow the objective, indirect firing may be effected, that is the data may be determined relatively to a fixed point which advantage is more particularly appreciable when high caliber guns are used which have to be hidden in shelters under conditions such that it would be difficult for the operators of the gun to observe and to follow the objective.

(*c*) Only two operatives, a gun pointer and a gun trainer are required at each gun for continuously and correctly laying the piece.

(*d*) The continuity of the pointing has for its consequence, as will be seen afterwards, an important simplification in the formulæ.

(*e*) The maximum of simplicity and strength is maintained for the material.

(4) The "corrector" gives also the indication of the "vent" (in other words the indication necessary for setting the fuse), which is determined in a strict manner by an improved process which consists in taking into consideration the derivative, relatively to the time, of the function representing the duration of the flight of the projectile. In the case when mechanical fuses are available, the indication of the setting of the fuse is itself electrically transmitted to a device which is combined with a fuse-setting device.

(5) The firing of the load of the gun is automatically produced by an electric switch at the precise moment when it is to be effected.

(6) The "corrector" comprises a small motor having a constant speed which through the intermediary of variable ratio transmissions produces a regular displacement of the sighting telescopes arranged on said apparatus. The shocks which cannot be avoided when the operation is made by hand are thus suppressed and, moreover, the duties of the operatives are considerably simplified. In other words, the operators which have to follow the objective, instead of actuating the telescopes have only to vary the ratio of the transmission between the motor and the telescope so as to adapt it to the movements of the objective.

Before describing the apparatus it is necessary to establish new formulæ and to refer to the well-known formulæ which are used and to show in what manner these formulæ are mechanically interpreted.

It will be assumed that the objective moves at a constant height H and that it is displaced with a rectilinear and uniform motion at a speed V.

The moment when the readings are made will be taken as origin of the times and the following notations will be used.

$t_1$ for the time when the shot is fired.

$t_2$ for the time when the projectile reaches its objective, $f_2$ for the duration $t_2-t_1$ of the flight, 0, 1, 2 are the indexes assigned to the values corresponding to the times 0, $t_1$, $t_2$.

In Fig. 1 of the accompanying drawings:

B′ is a horizontal projection of the eye of the gunner, $Z'_0$, $Z'_1$, $Z'_2$ are horizontal projections of the objective.

A′ is a projection of B′ on the path $Z'_0$ $Z'_2$.

$D'_0$, $D'_1$, $D'_2$ are horizontal projections of the distances of the objective to the gunner's eye.

$\theta_0$, $\theta_1$, $\theta_2$ are the angles of the path.

B″ is the projection of the gunner's eye on a vertical plane parallel to B′ $Z'_1$;

$Z''_0$, $Z''_1$, $Z''_2$ are the projections on one and the same vertical plane of the positions of the objective.

$D_0$, $D_1$, $D_2$ are the distances from the objective.

$\alpha_0$, $\alpha_1$, $\alpha_2$ are the angles of site.

$\omega_0$, $\omega_1$, $\omega_2$ are the azimuths measured from B′—A′ which is perpendicular to $Z'_0$—$Z'_2$.

$$\left(\frac{d\omega}{dt}\right)_0 \text{ and } \left(\frac{d\alpha}{dt}\right)_0$$

are the azimuthal and zenithal angular speeds.

$\delta=\omega_2-\omega_1$ is the kinetic correction in direction, to be determined.

$\sigma=\alpha_2-\alpha_1$ is the kinetic correction in site, to be determined.

$\delta_w$ is the wind correction in direction, $\sigma_w$ is the wind correction in site, W is the speed of the wind, $\psi$ is an angle between the direction of the wind and the line N S (an imaginary line running north and south) positively measured in a clockwise direction.

$\omega$ is the angle between the direction of the firing plane and the line N S measured as above.

$V_0$ is the initial speed of the projectile.

$h$ is the tangent elevation.

$i$ is the inclination to be given to the gun.

$e$ is the fuse-setting.

1. *Determination of sin δ.*

In the triangle B′$Z'_1$, $Z'_2$, $$\sin\delta=\frac{Vf_2}{D'_2}\sin\theta_1 \quad (1)$$

The triangles $Z'_1$A′B′ and $Z'_0$A′B′ give $$\sin\theta_1=\frac{A'B'}{D'_1};\ \sin\theta_0=\frac{A'B'}{D'_0}$$

whence:

$$\sin\theta_1=\sin\theta_0\frac{D'_0}{D'_1} \quad (2)$$

but sin $\theta_0$ is connected to the measured angular speed by the relation:

$$\left(\frac{d\omega}{dt}\right)_0=\frac{V\sin\theta_0}{D'_0}$$

which gives $$\sin\theta_0=\frac{D'_0}{V}\left(\frac{d\omega}{dt}\right)_0 \quad (3)$$

By replacing sin $\theta_0$ in (2) by this value $$\sin\theta_1=\frac{(D'_0)^2}{D'_1V}\left(\frac{d\omega}{dt}\right)_0$$

Lastly, by replacing sin $\theta_1$ in (1) by this value, $$\sin\delta=f_2\frac{(D'_0)^2}{D'_1D^2}\left(\frac{d\omega}{dt}\right)_0 \quad (4)$$

On the other hand:

$$D'_0=\frac{H}{\tan\alpha_0};\ D'_1=\frac{H}{\tan\alpha_1};\ D'_2=\frac{H}{\tan\alpha_2}$$

and we can write:

$$\alpha_1=\alpha_0+\frac{\sigma t_1}{f_2};\ \alpha_2=\alpha_0+\delta\left(1+\frac{t_1}{f_2}\right)$$

By substituting in (4) it comes:

$$\sin\delta=f_2\left[\frac{\tan\left(\alpha_0+\sigma\frac{t_1}{f_2}\right)\tan\left[\alpha_0+\sigma\left(1+\frac{t_1}{f_2}\right)\right]}{(\tan\alpha_0)^2}\right]\left(\frac{d\omega}{dt}\right)_0 \quad (5)$$

In the particular case of a continuous correction being effected which is practically carried out in an apparatus according to the present invention, since:

$$\alpha_1=\alpha_0\ \omega_1=\omega_0\ t_1=0$$

the formula is reduced to $$\sin\delta = f_2 \frac{\tan(\alpha_0+\sigma)}{\tan\alpha_0}\left(\frac{d\omega}{dt}\right)_0 \quad (6)$$

The above formula is strictly exact and the correcting factor $$\frac{\tan(\alpha_0+\sigma)}{\tan\alpha_0}$$

which it comprises may be automatically obtained as will be seen hereinafter by utilizing a very simple conoid which has a surface that is curved in accordance with $f(\alpha_0$ and $f(\sigma)$—

*2. Determination of sin σ.*

In the triangle $B''\ Z_1''\ Z_2''$, we have $$\sin\sigma = -Z''_1Z''_2\frac{\sin B''Z''_1Z''_2}{D_2} = -(D'_2-D'_1)\frac{H}{D_1D_2} \quad (7)$$

Referring to Fig. 1 it is seen that $D'_2-D'_1=Z'_1E+EC=Vf_2\cos\theta_1+D'_2\sin\delta\tan\frac{1}{2}\delta$.

Substituting this value of $D'_2-D'_1$ in (7) we get:

$$\sin\sigma = -\frac{Vf_2H}{D_1D_2}\cos\theta_1 - \frac{D'_2H}{D_1D_2}\sin\delta\tan\frac{1}{2}\delta \quad (8)$$

but on the other hand:

$$\left(\frac{d\alpha}{dt}\right)_0 = -V\cos\theta_0\frac{H}{D^2_0} \quad (9)$$

whence:

$$V = -\frac{D^2_0}{H\cos\theta_0}\left(\frac{d\alpha}{dt}\right)_0$$

By substituting this value of V in the first term of (8) and $\cos\alpha_2\sin\alpha_1$ for $$\frac{D'_2H}{D_1D_2}$$

in the second term of (8) we get:

$$\sin\sigma = f_2\frac{\cos\theta_1 D_0^2}{\cos\theta_0 D_1D_2}\left(\frac{d\alpha}{dt}\right)_0 - \cos\alpha_2\sin\alpha_1\sin\delta\tan\frac{1}{2}\delta$$

Simplifying the last term by expanding in series the terms sin 6 and tan $\frac{1}{2}\delta$, and then multiplying the factors together and neglecting terms of the fourth order and higher, we get:

$$\sin\sigma = f_2\frac{\cos\theta_1 D^2_0}{\cos\theta_0 D_1D_2}\left(\frac{d\alpha}{dt}\right)_0 - \frac{\delta 2}{2}\cos\alpha_2\sin\alpha_1 \quad (10)$$

but we can write:

$$\theta_1 = \theta_0 - \delta\frac{t_1}{f_2}$$

since the angle $Z'_0B'Z'_1$ is equal to $\delta\frac{t_1}{f_2}$ (assuming $\omega$ to be increasing proportionately).

We have then:

$$\frac{\cos\theta_1}{\cos\theta_0} = 1+\delta\frac{t_1}{f_2}\tan\theta_0 \quad (11)$$

On the other hand:

$$\sin\theta_0 = \left(\frac{d\omega}{dt}\right)_0\frac{D_0\cos\alpha_0}{V}$$

$$\cos\theta_0 = -\left(\frac{d\alpha}{dt}\right)_0\frac{D_0}{V\sin\alpha_0}$$

whence:

$$\tan\theta_0 = -\frac{\left(\frac{d\omega}{dt}\right)_0}{\left(\frac{d\alpha}{dt}\right)_0}\sin\alpha_0\cos\alpha_0 \quad (12)$$

By replacing $\tan\theta_0$ by this value in (11) we get:

$$\frac{\cos\theta_1}{\cos\theta_0} = 1-\frac{\delta t_1}{f_2}\frac{\left(\frac{d\omega}{dt}\right)_0}{\left(\frac{d\alpha}{dt}\right)_0}\sin\alpha_0\cos\alpha_0$$

By substituting this value in (10) we obtain $$\sin\sigma = f_2\frac{D^2_0}{D_1D_2}\frac{d\alpha}{dt} - \left(f_2\frac{D^2_0}{D_1D_2}\frac{d\omega}{dt}\right)\delta\frac{t^1}{f_2}\sin\alpha_0\cos\alpha_0 - \frac{\delta^2}{2}\cos\alpha_2\sin\alpha_1 \quad (13)$$

Referring to Equation 4 and considering $\delta$ equal to $\sin\delta$, it will be seen that this last equation may be written:

$$\sin\sigma = f_2\frac{D^2_0}{D_1D_2}\frac{d\alpha}{dt} - \delta^2\frac{t^1}{f_2}\sin\alpha_0\cos\alpha_0 - \frac{\delta^2}{2}\cos\alpha_2\sin\alpha_1$$

We have however:

$$D_0=\frac{H}{\sin\alpha_0},\ D_1=\frac{H}{\sin\alpha_1},\ D_2=\frac{H}{\sin\alpha_2}$$

and it may be admitted that:

$$\alpha_1=\alpha_0+\sigma\frac{t_1}{f_2};\ \alpha_2=\alpha_0+\sigma\left(1+\frac{t_1}{f_2}\right)$$

By substituting in (13) and simplifying, we get, $$\sin\sigma=f^2\frac{\sin\left(\alpha_0+\sigma\frac{t^1}{f_2}\right)\sin\left[\alpha_0+\sigma\left(1+\frac{t_1}{f_2}\right)\right]}{\sin 2\alpha_0}\left(\frac{d\alpha}{dt}\right)-\quad(14)$$

$$\frac{\delta^2}{2}\cos\alpha_2\sin\alpha_1-\delta^2\frac{t^1}{f_0}\sin\alpha_0\cos\alpha_0$$

$$(\cos\alpha_2\sin\alpha_1+2\frac{t_1}{f_2}\frac{\cos\alpha_1}{\cos\alpha_0}\cos\alpha_2\sin\alpha_0)$$

In the particular case when a continuous correction is effected which is practically carried out in the apparatus according to the present invention, since:

$$\alpha_1=\alpha_0\quad\omega_1=\omega_0\quad t_1=0$$

the formula (14) is reduced to:

$$\sin\sigma=\frac{f_2\sin(\alpha_0+\sigma)}{\sin\alpha_0}\cdot\left(\frac{d\alpha}{dt}\right)_0-\frac{\delta 2}{2}\sin\alpha_0\cos\alpha_2\quad(15)$$

This formula is strictly exact and the two correcting factors which it comprises, that is $$\frac{\sin(\alpha_0+\sigma)}{\sin\alpha_0}$$

and $$\frac{\delta^2}{2}\sin\alpha_0\cos\alpha_2$$

may, as will be seen hereinafter, be automatically obtained. The first one by means of a conoid formed according to $f(\alpha_0)$ and $f(\sigma)$ and the second by means of a conoid formed according to $f(\alpha_0)$ and $f(\delta)$ (since in the second term $\alpha_2$ may without any appreciable error be replaced by $\alpha_0$).

3. *Determination of the wind corrections.*

The two following well-known formulæ have been used for wind corrections:

$$\delta_w=F(H,\alpha_0)\ W\sin(\omega-\psi)\quad(16)$$

(in which $F(H,\alpha_0)$ is an empiric function deduced from firing tables) and $$\sigma_w=0.00025\ HW\cos(\omega-\psi)\quad(17)$$

For applying the above formulæ two conoids are used which are rotated according to $f(\omega-\psi)$ and which are displaced along their axes through the distances equal to $F(H,\alpha_0)$ W and 0.00025 HW respectively.

The latter two quantities are in fact determined by means of two graphs on which are drawn the group of convergent lines respectively graduated in $F(H,\sigma_0)$ and in H according to their angular coefficients. The said graphs are wound upon two drums the rotation of which is effected according to $f(W)$. The values of the products $F(H,\alpha_0)$ W and 0.00025 HW are read along a generating line upon corresponding lines. The value of $F(H,\alpha_0)$ is itself determined according to a special graph constructed as a function of H and $\alpha_0$.

4. *The determination of $f_2$.*

Both formulæ (6) and (15) which give $\delta$ and $\sigma$ assume that the determination of the duration $f_2$ of the flight has been effected. This determination will be effected by means of a graph comprising a group of curves corresponding to the various heights and drawn as a function of the angle of side and of the said duration.

As $f_2$ is in fact a function of H and of the future angle of site $\alpha_0+\sigma$, it will be necessary at the commencement of each operation to act by means of successive approximations and take as a first approximate value of $f_2$ a value corresponding to $\sigma=0$, but this does not introduce any complication in the utilization of the apparatus because as it will be seen afterwards, all these calculations will be automatically effected.

5. *Determination of the setting of the fuse e.*

If it were possible to effect the adjustment of the fuse in the bore of the gun, and at the moment when the shot is fired, then the fuse-setting $e$ could be considered as a function of the future angle of site $\alpha_0+\sigma$ and of the duration $f_2$ of the flight. But the fuses which are used at present must be adjusted before the projectile is inserted in the gun, and it is therefore necessary to take into account the variation of $f_2$ during the time $t_3$ which is necessary for adjusting the fuse and for loading the gun.

To this end the product $$t_3\left(\frac{df_2}{dt}\right)_0$$

will be automatically determined and $e$ will be read on a graph comprising a group of curves corresponding to the various values of $e$ and drawn as functions of the angle of site and of the duration $f_2$ of the flight.

Theoretically the said reading should be made for the point which is determined by the duration $$f_2+t_3\left(\frac{df_2}{dt}\right)_0$$

of the flight and by the angle of site $$\alpha_0+\sigma\left(1+\frac{t_3}{f_2}\right);$$

however, no appreciable error will be introduced if the term $$\sigma\frac{t_3}{f_2}$$

is cancelled in the expression of the angle of site because for a given duration of the flight, the fuse-setting varies very slowly only with the angle of site. It should be pointed out that when use is made of mechanical fuses the fuse-setting will be entirely independent of the angle of site and that the simple relation $$e=f_2+t_3\left(\frac{df_2}{dt}\right)_0$$

will be then obtained.

*6. The determination of the tangent elevation.*

The tangent elevation $h$, that is the angle through which the gun should be vertically displaced in addition to the future angle of site will be considered as being a function of the duration $f_2$ of the flight and of the future angle of site $\alpha_0+\sigma$ will be automatically determined by means of a special conoid.

To simplify the drawings and explanation, the corrector has been illustrated in combination with a single gun having suitable indicators for pointing and training, but it will be apparent that the corrector may be used equally as well with a plurality of guns. In practice it would probably be desirable to employ the corrector to control the fire of a battery of several guns.

The invention will be understood by reference to the accompanying drawings, in which like reference numerals refer to like parts throughout the several views, and in which:

Fig. 1 is an explanatory diagram.

Figs. 2 and 2[a] show diagrammatically the whole arrangement of the members of the corrector, their mechanical connections and the electrical connections between the corrector and one of the guns of the battery which is to be controlled by said corrector.

Fig. 3 shows details of one of the conoids.

Figs. 4 and 5 are respectively a lateral elevation and back view of the mechanical tachometer for determining the setting of the fuse.

In all the above figures, the electrical connections have been shown with dotted lines and the transmission shafts with dot and dash lines.

Figure 2:
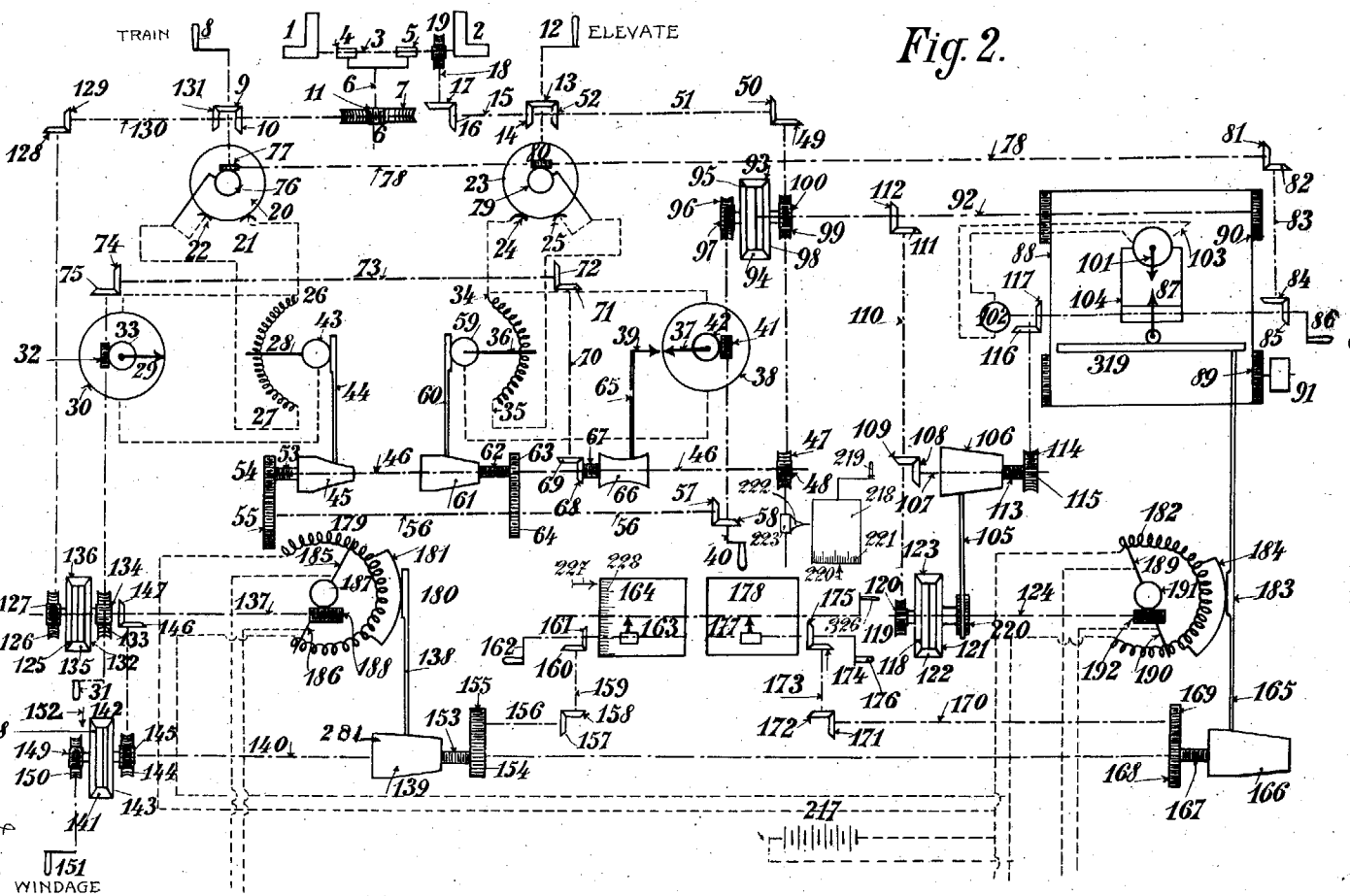

Referring to Fig. 2, 1 is a training telescope for controlling the angle of train of a gun and 2 is an elevating telescope for controlling the pointing in elevation of said gun in a manner to be described more fully hereinafter. The two telescopes are of the periscope or "bent" type and are mounted at the ends of a common shaft 3 carried by two bearings 4 and 5 fixed to the casing which contains all the other members. In this casing, which has not been illustrated, the various members are preferably grouped otherwise than they are shown in the diagram where their distribution has been dispersed in such a manner as to be projected for clearness of the drawing upon a single plane thereby avoiding a superposition of members. The casing which supports the bearings, which have not been illustrated, of the various shafts illustrated in the diagram may rotate together will all the members which it contains, around a vertical axis 6 integral with a large worm wheel 7 fixed to the fixed stand of the apparatus.

The movement for training the whole arrangement is obtained by actuating a handle 8 which, through the intermediary of pinions 9 and 10, drives a worm 11 which bears upon the fixed worm wheel 7.

The movement for pointing or elevating the two telescopes is obtained by actuating a handle 12 which, through the intermediary of pinions 13 and 14, of a shaft 15, and pinions 16 and 17 drives a worm 18 which rotates the worm wheel 19 keyed on the shaft 3.

The handle 8 drives through the intermediary of a shaft carrying pinion 9, the armature 20 of a small magneto, one brush 21 of which is fixed whilst the other brush 22 is displaced, as it will be hereinafter explained, proportionally to the values of $f_2$. The electric voltage supplied by the armature 20 is evidently proportional to its angular speed $$\left(\frac{d\omega}{dt}\right)_0$$

If a uniform distribution of the magnetic flux is secured in the magneto, the voltage supplied by armature 20 may also be rendered proportional to the angular distance between the brushes 21, 22, that is, said voltage will be proportional to $f_2$.

It is therefore possible to obtain a voltage between 21 and 22 which shall be proportional to the product $$f_2\left(\frac{d\omega}{dt}\right)_0$$

If the commutator of the magneto has a sufficient number of segments, then if weak voltages and very weak currents only are used, any formation of sparks is easily avoided, whatever the position of the movable brush may be.

The handle 12 drives the armature 23 of a small magneto, one brush of which 24 is fixed whilst the other 25 is displaced, as is 22, an angular distance proportional to the values of $f_2$. A voltage which is proportional to the product $$f_2\left(\frac{d\alpha}{dt}\right)_0$$

is therefore obtained between 24 and 25.

The armature 20 is connected to the ends of a rheostat 26, 27 arranged along an arc of a circle and on which a movable contact 28 rubs which contact is automatically carried over as it will be explained hereinafter, in such a manner that the arc 26, 28 shall be constantly proportional to $$\frac{\tan(\alpha_0+\sigma)}{\tan\alpha_0}$$

The pointer 29 of a voltmeter 30 connected between the points 26, 28 will therefore be deviated through an angular distance proportional to the product $$f_2\frac{\tan(\alpha_0+\sigma)}{\tan 0}\left(\frac{d\omega}{dt}\right)_0$$

that is, an angular distance proportional to $\delta$ (see formula (6)). An operative will maintain pointer 29 during the operation of the apparatus, adjacent a zero graduation by actuating handle 31, which, through the intermediary of a worm 32 causes the rotation of a wheel 33 to which is fixed at one end a spiral spring supplying the antagonistic couple intended to balance the magnetic couple applied to the frame of the voltmeter 30. As the couple of the spiral is proportional to its torsion it will be seen that the number of revolutions of the handle 31 is proportional to $\delta$.

The armature 23 is connected to the ends of a rheostat 34, 35 arranged along an arc of a circle and on which a movable contact rubs which contact is automatically driven as will be hereinafter explained in such a manner that the arc 34, 36 shall be constantly proportional to $$\frac{\sin(\alpha_0+\sigma)}{\sin\alpha_0}$$

The pointer 37 of a voltmeter 38 connected between the points 34 and 36 will therefore be deviated through an angular distance proportional to the product $$f_2\frac{\sin(\alpha_0+\sigma)}{\sin\alpha_0}\left(\frac{d\alpha}{dt}\right)_0$$

The zero of the graduation of the voltmeter 38 is represented by the pointer 39 and the said pointer is displaced as will be explained hereinafter proportionally to $$\frac{\delta^2}{2}\cdot\cos\alpha_0\cdot\sin\alpha_0.$$

If equal coefficients of proportionality are adopted, the angular distance between the two pointers 37 and 39 will be proportional to $$f_2\frac{(\sin\alpha_0+\sigma)}{\sin\alpha_0}\left(\frac{d\alpha}{dt}\right)_0-\frac{\delta^2}{2}\sin\alpha_0\cdot\cos\alpha_0,$$

that is proportional to $\sigma$ (see formula (15)). During the operation of the corrector an operative will maintain the pointer 37 opposite the pointer 39 by operating a handle 40 which, through the intermediary of a worm 41, causes the rotation of the wheel 42, to which is fixed one end of a spiral spring which supplies the antagonistic couple intended to balance the electro-magnetic couple applied to the frame of the voltmeter 38. As the couple of the spiral is proportional to its torsion it is seen that the number of revolutions of the handle 40 is proportional to $\sigma$.

The displacement of the movable contact 28 is automatically obtained in the following manner: The said contact is fixed at one end of a level integral with the pinion 43 gearing with a rack 44 which is vertically displaced and the lower end of which remains constantly applied against the surface of a conoid 45.

In order that the displacements of 44 and therefore those of 28 shall be rendered proportional to $$\tan\frac{(\alpha_0+\sigma)}{\tan\alpha_0},$$

it is sufficient to mount the conoid in such a manner as to cause its rotation together with the shaft 46 to take place as a function of $\alpha_0$ whilst displacing it longitudinally along 46 according to $f(\sigma)$. The rotation of the shaft 46 is obtained by means of a worm wheel 47, of a worm 48, pinions 49 and 50, a shaft 51, pinions 52 and 13 and a handle 12. The longitudinal displacement is obtained by means of a screw 53, of pinions 54, 55, of a shaft 56, of pinions 57, 58 and a handle 40 which, as seen above rotates according to $f(\sigma)$. The details of construction of conoid 45 are given hereinafter by way of example in the description of Fig. 3.

The displacement of the movable contact 36 is automatically obtained in the following manner: The said contact is fixed at one end of a lever integral with a pinion 59 gearing with a rack 60 which is vertically displaced and the lower end of which remains constantly applied against the surface of a conoid 61. In order that the displacements of 60 and therefore those of 36 shall be rendered proportional to $$\frac{\sin(\alpha_0+\sigma)}{\sin\alpha_0},$$

it is sufficient to mount the conoid 61 in such a manner as to cause its rotation together with the shaft 46, which as seen above, is driven in function of $\alpha_0$, whilst it is longitudinally displaced along 46 according to $f(\sigma)$. The longitudinal displacement is obtained by means of a screw 62, of pinions 63, 64 and of a shaft 56 which, as seen above, rotate proportionally to $\sigma$.

The displacement of the movable pointer 39 is automatically obtained by means of a rod 65 which is vertically displaced and the lower end of which remains constantly applied against the surface of a conoid 66. In order that the displacements of 39 shall be rendered proportional to $$\frac{\delta^2}{2}\sin\alpha_0\cos\alpha_0,$$

it is sufficient to mount the conoid 66 in such a manner as to cause its rotation together with the shaft 46 which, as seen above, is driven proportionally to $\alpha$, whilst it is longitudinally displaced according to $f(\delta)$. The said longitudinal displacement is obtained by means of a screw 67, of pinions 68, 69, of a shaft 70, of pinions 71, 72, of a shaft 73, of pinions 74, 75, of worm 32, and of handle 31 which, as seen above, rotates proportionally to $\delta$.

It is stated above that the brushes 22 and 25 were automatically displaced proportionally to $f_2$. The said displacement is obtained in the following manner: The brush 22 is integral with a worm wheel 76 driven by a worm 77 mounted on a shaft 78. On the other hand, the brush 25 integral with a worm wheel 79, is driven by a worm 80 mounted on the same shaft 78. The said shaft 78 is operated by means of pinions 81, 82 of a shaft 83 and of pinions 84, 85, by a handle 86 which serves to drive the pointer 87 by means of a screw and nut on the graph 88 (which has been mentioned before with reference to the determination of $f_2$), in such a manner as constantly to maintain the said pointer 87 upon the curve corresponding to the indicated height. The said curves are drawn by measuring vertically the angle of site and horizontally the corresponding value of the duration of flight and the graph 88 is driven as will be hereinafter explained in such a manner that the horizontal line passing through 87 shall correspond to the future angle of site $\alpha_0+\sigma$. It is seen that under these conditions the displacements of the pointer 87 will be equal to $f_2$ and that therefore the shaft 78 and the brushes 22 and 25 will indeed rotate proportionally to $f_2$.

The graph 88 is drawn on a sheet which is wound upon two rollers 89 and 90. The upper roller 90 is driven by a shaft 92 integral with the satellites 93, 94 of a differential gear, one pinion 95 of which is actuated proportionally to $\sigma$ by means of a worm wheel 96, a worm 97 and a handle 40 whilst the other wheel 98 is driven proportionally to $\alpha_0$ by means of a worm wheel 99, a worm 100, pinions 49, 50, shaft 51, pinions 52 and 13 and a handle 12. The graph sheet 88 is therefore driven by 92 proportionally to $\alpha_0+\sigma$.

The cloth on which are drawn the curves H which form the graph 88 is also provided with a group of curves giving the fuse-setting $e$, considered as functions of the duration $f_2$ of the flight end of the site. The curves giving the fuse-setting $e$ are little different from those which give $f_2$ and will therefore be almost equidistant and will be very little part from the vertical line. These are excellent conditions for facilitating the reading of the fuse-setting which will be made as previously explained, opposite the pointer 101, which is practically displaced on the same horizontal line as 87 and which should be horizontally displaced an amount $$t_3\left(\frac{df_2}{dt}\right)_0$$

relatively to the latter.

To simplify the drawings and explanation, it will be assumed that the said result is obtained by means of a small magneto 102 operated by 86 and which therefore can supply a tension equal to $$t_3\times\left(\frac{df_2}{dt}\right)_0$$

which is connected to a voltmeter 103 mounted on a carriage 104 driven together with the displacement of 87. It is immediately seen that the displacement of 101 relatively to the graph would indeed be under these conditions equal to $$f_2+t_3\left(\frac{df_2}{dt}\right)_0;$$

but that is only a theoretical arrangement which in practice will be replaced by the one illustrated in Figs. 4 and 5.

The tangent elevation $h$, which is considered as a function of $f_2$ and of $\alpha_0+\sigma$, is automatically given by a vertical displacement of the rod 105 the upper end of which is constantly applied against a conoid 106. This conoid is mounted in such a manner as to be capable of rotating with a shaft 107 according to $f\ (-\alpha_0+\sigma)$ and moreover to be displaced along the said shaft according to $f(f_2)$. The rotation of the shaft 107 is obtained by means of pinions 108, 109 of a shaft 110, pinions 111, 112 and of shaft 92 which, as seen above rotates proportionally to $\alpha_0+\sigma$; the longitudinal displacement is obtained by means of a worm 113, worm wheel 114, worm 115, pinions 116 and 117 and handle 86 which, as seen above, rotates according to the value $f(f_2)$.

In order to obtain the inclination $$i=\alpha_0+\sigma+h,$$

which should be given to the gun when the wind is zero, a differential gear is used, one pinion 118 of which is driven proportionally to $\alpha_0+\sigma$, by a worm wheel 119 and a worm 120 mounted on a shaft 110 (which, as seen above rotates according to a function of $\alpha_0+\sigma$), whilst the other pinion 121 is driven proportionally to the angle of tangent elevation $h$ by means of a pinion 220 which gears with a rack fixed to the lower end of rod 105 which, as seen above, is displaced proportionally to $h$. The satellites 122 and 123 of the differential gear cause the rotation of the shaft 124 proportionally to $\alpha_0+\sigma+h$, that is, proportionally to $i$.

In order to obtain the future azimuth $$\omega=k+\omega_0+\delta$$

(measured from the direction N–S) which should be given to the gun when the wind is zero, a differential gear is used, one pinion of which 125 is driven proportionally to $\omega_0$ by means of a worm wheel 126, of a worm 127, of pinions 128, 129 of a shaft 130, of pinions 131 and 9 and of handle 8, whilst the other pinion 132 is driven proportionally to $\delta$ by means of a worm wheel 133, a worm 134 and handle 31 which, as seen above rotate proportionally to $\delta$. The satellites 135 and 136 of the differential gear cause the rotation of the shaft 137, proportionally of the sum $\omega_0+\delta$ to which a constant K is added, equal to the angular difference between direction B′A′ and the direction N–S.

The correction of the training for taking into account the influence of the wind is automatically given by the vertical displacement of a rod 138, the lower end of which is constantly applied against the conoid 139; this conoid is mounted in such a manner as to be capable of rotating together with the shaft 140 according to a function of $\omega-\psi$ and to be also capable of being displaced along the said shaft according to $F(H,\alpha_0)$. The shaft 140 is driven by the satellites 141, 142 of a differential gear one pinion 143 of which is driven proportionally to $\omega$ by the worm wheel 144, worm 145, pinions 146, 147 of the shaft 137 which as seen above, rotates according to $f\ (\omega)$, whilst the other pinions 148 is driven according to $f(\psi)$, by the worm wheel 149, worm 150 and handle 151 which is actuated by an operative, who is responsible for the windage corrections, in such a manner as to bring the indication $\psi$ of the graduation drawn on 148 under a fixed pointer 152. The shaft 140 is thus rotated through an angle $\omega-\psi$. The longitudinal displacement is obtained by means of a screw 153, pinions 154, 155, shaft 156, pinions 157, 158, shaft 159, pinions 160, 161 and handle 162 integral with a screw on which is mounted a nut carrying a pointer 163 which the operative, who affects windage corrections brings on the curve of the graph 164 corresponding to the value of $F\ (H,\alpha_0)$ indicated as will be shown hereinafter. The graph 164 is carried by a drum which is displaced by hand by acting upon the handle 326 in such a manner as to bring the fixed pointer 227 in front of the indication W on the graduation of speeds 228 drawn on the periphery of the drum 164. The value of $F\ (H,\alpha_0)$ is read upon a graph carrying drum 218 which is rotated by hand by means of a handle 219 in such a manner as to bring the fixed pointer 220 opposite the indication H upon the graduation of altitudes 221 drawn on the periphery of the drum. The reading is made opposite the pointer 222 which is automatically driven according to a function of the angle of site along a generating line of the drum 218; the said automatic driving is obtained by means of a nut 223 mounted on worm 48 which, as seen above, rotates according to $f\ (\alpha_0)$.

The value of $F\ (H,\alpha_0)$ read from the graph on the drum 218, designates the proper curve on the drum 164. Pointer 163 is maintained on this curve by means of handle 162, the longitudinal displacement of pointer 163 being, therefore, proportional to $F\ (H,\alpha_0).W$. The longitudinal displacement of the pointer is transmitted by means of pinions 161, 160, shaft 159, pinions 158, 157, shaft 156, pinions 155, 154, to the screw 153 which displaces the conoid 139 longitudinally proportionally to F $(H,\alpha_0)$.W. Conoid 139 is rotated as explained above, by shaft 140 according to the angle $(\omega-\psi)$, and the member 138 is therefore displaced proportionally to F $(H,\alpha_0)$ W sin $(\omega-\psi)$, that is, proportionally to $\delta_w$ (equation (16)).

The correction of the angle of site for taking into account the influence of the wind is automatically given by a vertical displacement of a rod 165 the lower end of which is constantly applied against the conoid 166.

The said conoid is mounted in such a manner as to be capable of rotating with the shaft 140 according to $f$ $(\omega-\psi)$ and also to be capable of being displaced along the said shaft according to a function of 0.00025 HW. It has been previously seen how the shaft 140 is driven according to a function of $\omega-\psi$. The longitudinal displacement $fs$ obtained by means of a screw 167, pinions 168, 169, a shaft 170, pinions 171, 172 of a shaft 173, of pinions 174, 175 and of a handle 176 integral with the screw on which is mounted a nut carrying the pointer 177 which the operative who makes the windage corrections brings on the curve of the graph 178 corresponding to the value H. The graph 178 is carried by a drum which is integral with the graph carrying drum 164.

The influence of the wind on the duration $f_2$ of the flight is in fact a complex function which depends more particularly on $\sigma_w$, on the angle of site and on $f_2$ itself. Although it is not possible to establish any algebraical formula giving the value of the corresponding correction, it is immediately seen that this correction should be directly proportioned to $\sigma_w$, and that it should diminish when the angle of site increases. This correction has therefore the general form of the function $$\sigma_w\left(\frac{df_2}{d\alpha}\right)\alpha_0+\sigma.$$

In order to take it into account it has been provided that the determination of $f_2$ on the graph 88 would be effected for the point corresponding to the height H and to the angle of site $\alpha_0+\sigma+P\sigma_w$, in which formula P is a constant depending more particularly on the type of projectile which is used. In order automatically to obtain the addition of the term $P.\sigma_w$, a differential gear could be provided on the shaft 92 but in order to simplify the drawings only a horizontal ruler 319 has been illustrated in the diagram which ruler is fixed on to the upper part of the rod 165 and on which the lower end of the pointer 87 bears constantly, the said pointer being mounted in such a manner as to be capable of sliding freely in a vertical direction relatively to the carriage which displaces it horizontally.

It is unnecessary, as has already been pointed out, to bring a secondary correction of the order of size of $\sigma_w$ in the vertical position of the pointer 101 which gives the fuse-setting $e$.

The transmission to the gun, of the data for firing may be effected as shown in the diagram by using the electrical apparatus for indicating and repeating movements at a distance, described in my U. S. Patent No. 1,402,096, dated January 3, 1922. This electrical apparatus is based on the known principle of Wheatstone bridge, that it comprises at each station a circular rheostat occupying an arc equal to ¾ of a circle and on which two movable diagrammatically opposite contacts are rubbing the order which has been transmitted to the receiving station, is carried out there by operating the movable contact until the pointer in the voltmeter is brought back to zero.

In order to make a correction of an order which has been transmitted, the transmitting rheostat may be displaced relatively to its brushes and it is precisely this artifice which has been used for adding the wind corrections to the main elements of the future angle of site and azimuth. For instance, the rheostat 179 which is provided for transmission of angle of azimuth is displaced according to a function of the wind correction by rod 138, rack 180, and a toothed arc 181, intgeral with 179. Also, in the same manner the rheostat 182 which is provided for the transmission of the angle of site is displaced according to a function of the wind correction by rod 165, rack 183, and toothed arc 184 integral with 182.

The future angle of azimuth is transmitted by the displacement of brushes 185 and 186 fixed on the worm wheel 187 which is driven by a worm 188 keyed on the shaft 137 which, as seen above rotates according to a function of $\omega_0+\delta$.

The future angle of site is transmitted by the displacement of brushes 189 and 190 secured on the worm wheel 191 which is driven by a worm 192 keyed on the shaft 124 which, as seen above, rotates according to a function of the inclination $i$ to be given to the gun.

When setting up or positioning the corrector, the zero of graduation in $\psi$ carried by the pinion 148 is brought in front of the pointer 152; then the handle 8 is actuated in such a manner as to bring the zero of the peripheral graduation which is common to the two conoids 139 and 166 in front of the pointer 281. The station, or corrector, is then directed towards the north by displacing it relatively to its stand and with out interfering with the pointing handle; lastly the large worm wheel 7 is fixed to the stand.

The gun 193 is trained by means of a handle 194, a shaft 195 passing in bearings 196 fixed to the gun carriage 197 and carrying a pinion 198 gearing with the circular toothed member 199 fixed to the saddle. The shaft 195 is also provided with a screw 200 which causes a rotation of the wheel 201 carrying the movable brushes 202 and 203 of the rheostat 204 used as a receiver of angles of azimuth. The gun trainer actuates the handle 194 in such a manner as to maintain the pointer of the voltmeter 205 at zero.

The pointing of the gun is effected by means of a handle 206, a shaft 207 carrying a worm 208 gearing with a toothed sector 209 fixed to one of the trunnions 210 of the gun. The shaft 207 is also provided with a worm 211 adapted to rotate a wheel 212 which carries the contacts 213 and 214. The latter coacts with the rheostat 215. The gun pointer actuates handle 206 in such a manner as to mantain the pointer of the voltmeter 216 at zero.

A storage battery 217 serves to feed the rheostat 179, 182, 204 and 215.

The connections between the source 217 and the rheostats and the connection between the movable contacts and the voltmeters are shown by the dotted lines.

Besides those which are shown in the diagram there are also electrical connections between the corrector and the guns which transmit the fuse settings and which automatically fire the gun.

Fig. 3 illustrates by way of example details of the conoid 45 of Fig. 1 which displaces the rack 44 proportionally to $$\frac{\tan(\alpha+\sigma)}{\tan \alpha_0}$$

The movement of rotation of conoid 45 is obtained by the rotation of a key 221 engaging a recess 222 provided in such conoid and its movement of translation is produced by the rotation of a screw 53 which can rotate freely on the shaft 46 between the two collars 223 and 224 integral with the latter.

Figs. 4 and 5 illustrate the mechanical tachometer which may be used in practice instead of the magneto 102 and the voltmeter 103 illustrated in the diagram of Fig. 2 in order to obtain $$t_2\left(\frac{df_2}{dt}\right)_0,$$

and instead of the driving carriage of the pointer 87. We find here again the ruler 319, rod 165 (Fig. 4), handle 86 and pointer 101, which serve to determine $e$.

225 and 226 illustrate two mechanical tachometers operated by the handle 86 and measuring $$t_2\frac{df_2}{dt}.$$

These two apparatus are of the known type which give a deviation, the direction of which is always the same and the pointer of which is locked in the zero position when the speed is nil. They are mounted in a common casing which is not shown and are alternately operated by a vertical shaft 227 through any suitable means such as ratchet and pawl mechanism (not shown) in such a manner that according to the direction of rotation of the latter, one only of the two tachometers is put into service whilst the other is in the position of rest. The shafts 228 and 229 operate, instead of the ordinary pointers, a differential gear 230, the satellites of which carry the toothed wheel 231, gearing with a rack 232 to which a pointer 101 is fixed. It is thus seen that the said pointer which for $$\frac{df_2}{dt}=0$$

is in its position of rest opposite 87 will be in normal service displaced to the right or to the left through a distance $$t_2\times\frac{df_2}{dt}.$$

The driving of the shaft 227 is to be obtained by means of pinions 233, 234, the bearing member 235 mounted on the screw 236, and the projection 237, the end of which engages in a groove 238 provided along a screw 236. In order that 233, 234 shall remain in engagement it is necessary that 235 shall be driven together with displacement of the carriage 239 which supports 225 and 226. This displacement is obtained by a bearing 240 integral with 239 which acts in one direction upon 234 and in the other direction upon a collar 241′ fixed to the member 235.

The displacement of the carriage 239 is obtained by means of a nut 241 fixed to 239 and mounted on a screw 236.

The ruler 319 receives vertical displacements equal to $P\sigma_w$, through the intermediary of a rack 242, of pinions 243, 244 and of a rack 245 fixed to 165 (Fig. 4).

A rod 246 parallel to 236 and traversing a socket 247 fixed to 239 serves to support the whole arrangement and to prevent its rotation around 236.

For the tachometers, 225 and 226, apparatus based on the following known principle will preferably be used:

A clock-work mechanism wound up by the rotation of a shaft 236 establishes during $t_3$ seconds a coupling between the said shaft and a wheel which is afterwards constantly brought into its starting position, then coupled again during a period of $t_3$ seconds and so on. An escaping mechanism allows of maintaining the measure of the last angular displacement imparted to the wheel. This displacement is in fact proportional not to $$t_3 \frac{df_2}{dt_0},$$

but to the product of $t_3$ by the mean speed $$\left(\frac{df_2}{dt}\right)_m$$

during the duration $t_3$. Under the only condition that $t_3$ shall be small enough there is no theoretical drawback in substituting $$\left(\frac{df_2}{dt}\right)_m$$

for $$\left(\frac{df_2}{dt}\right)_0$$

and on the contrary this solution has in practice the advantage of facilitating in a large measure the reading of the fuse-setting as the pointer 101 remains then movable relatively to the carriage during $t_3$ seconds. The adoption of tachometers provided with clock work mechanisms and established as it has just been explained permits the intervention at the desired moment of an optical or acoustic signal for adjusting the regularity of the firing or preferably provides for automatically operating an electric switch to actuate the firing or preferably provides for automatically operating an electric switch to actuate the firing. In order to obtain the maximum of efficiency it is necessary that the indication of the fuse-setting for the $(n-1)^{th}$ shot be transmitted a little before the $n^{th}$ shot has been fired in such a manner that the fuse setter shall have time to perform his work; it will therefore be necessary to provide for a certain angular gap between the escapement of the tachometers and the actuation of the firing mechanism. It seems useless to insist on the importance of these connections since the accuracy of the firing depends on them.

For firing, any of the known electro-magnetic devices may be used in which the closing of a switch, which should be placed on the corrector is automatically effected, and produces the mechanical displacement which is necessary for the firing of the shot by means of electro-magnets placed on each of the guns.

The fuse-settings may be transmitted by telephone or by an electric transmission of the same type as the one illustrated in Fig. 2 for sending the angles of elevation and azimuth to the gun. In the latter case, and when use is made of fuse setting apparatus it will be preferable to mechanically interconnect the latter with the actuator of the receiving rheostat. When use is made of mechanical fuses, the operation of the transmitting rheostat will be mechanically connected to the handle 86 of Fig. 2.

Figure 6:
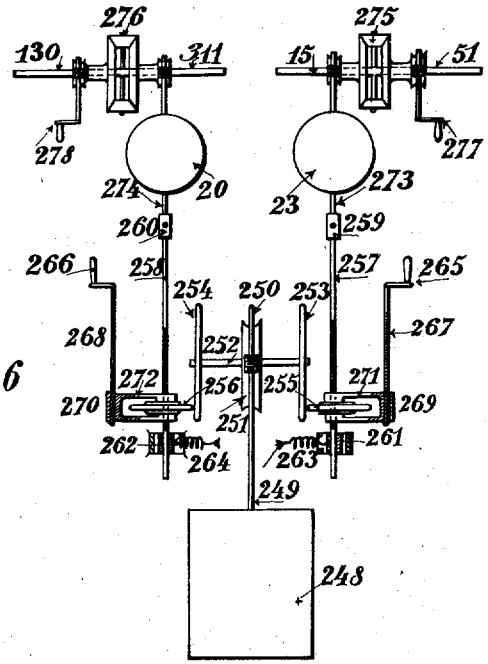
Fig. 6 shows the device for displacing the pointing handles.

Fig. 6 illustrates diagrammatically a device which may be used for actuating the handles 8 and 12 of the training and elevating mechanisms.

248 illustrates an electric motor having a shaft 249 which rotates two driving disks 253 and 254 by means of a worm 250 and a worm wheel 251, keyed to a shaft 252, on which are mounted said disks. Milled wheels 255 and 256, which frictionally engage said driving disks, and which may be displaced along the diameters of the latter, are slidably mounted on two shafts 257 and 258. Milled wheels 255 and 256 rotate said shafts by means of projections which engage longitudinal grooves formed in the shafts. The upper bearings 259, 260 are arranged in such a manner as to be capable of oscillating around two axes perpendicular to the plane of the figure whilst the lower bearings 261, 262, lodged in oval bearings allowing them to be displaced in the plane of the figure, are subjected to the action of springs 263, 264 which maintain wheels 255 and 256 in frictional engagement with plates 253 and 254.

The displacement of 255 and 256 along 257 and 258 is obtained by acting upon handles 265, 266 which rotate the screws 267, 268 on which are mounted the nuts 269, 270 integral with the forks 271, 272. It is seen that if the motor 248, rotates at constant speed, speeds will be obtained at 273, 274 which will be variable at will in amount and direction.

These ends of shafts 273 and 274 are used for operating the shafts on which are mounted the handles 8 and 12 of Fig. 2. The magnetos 20 and 23 have been illustrated in Fig. 6 and the shafts 130—311 and 15—51 of Fig. 2. The magnetos 20 and 23 are directly driven by 273 and 274 whilst the shafts 130—311 and 15—51 are integral with satellites of differential gears 275—276 one pinion of which is driven by the shafts 273, 274 whilst the other can be displaced by actuating the handles 277 and 278 which are used for bringing back when necessary the images of the objective on the cross wires of the telescopes 1 and 2 whilst the handles 265, 266 should serve only for fixing the images relatively to the cross wires by imparting to the telescopes angular speeds equal to those of the objective. It will be noticed that the operation of 277 and 278 has no influence on the voltage of the magnetos 20 and 23 and that the said arrangement avoids all shocks in the working of the corrector.

Figure 7:
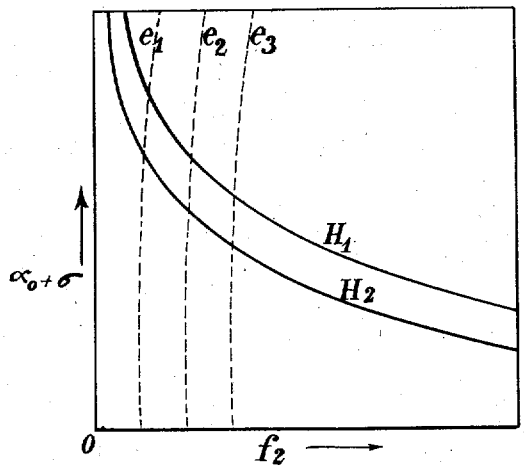
Fig. 7 shows the graph which gives $f_2$ and $e$.

Fig. 7 illustrates the general arrangement of the curves giving distances H according to a function of the angles of sites $\alpha_0 + \sigma$ and of the duration $f_2$ of the flight and the fuse-setting $e$ considered as functions of $f_2$ and of $\alpha_0+\sigma$. The future angles of site have been measured vertically and the values of $f_2$ horizontally. The curves corresponding to the values of H have been drawn in full lines and the curves corresponding to the value of $e$ in dotted lines.

The operation of the corrector requires a crew of six men whose duties are as follows:

A trainer who actuates handle 8 in such a manner as to maintain the image of the object on the vertical wire of the cross wires of the telescope 1. This simple operation produces automatically the following results:

1. The armature 20 supplies a voltage proportional to $$\left(\frac{d\omega}{dt}\right)_0.$$

2. The whole of the apparatus is driven around the vertical axis 6.

3. An azimuthal displacement of the objective is transmitted to the gun (through 179) and to the conoids 166 and 139 which give the wind corrections.

A pointer actuates handle 12 in such a manner as to maintain the image of the object on the horizontal wire of the cross-wires of the telescope 2. This simple operation gives automatically the following results:

1. The armature 23 supplies a voltage which is proportional to $$\left(\frac{d\alpha}{dt}\right)_0.$$

2. The telescope 1 is carried along, when pointing telescope 2 through the angle of site.

3. The zenithal displacement of the objective is transmitted to the gun (through 182) and to the conoids 45, 61, 66 and 106, to the sheet of the graph 88.

The third member of the crew of operatives actuates handle 31 in such a manner as to maintain the pointer 29 opposite a fixed point. This simple operation produces automatically the following results:

1. The correction $\delta$ is introduced (through 179) in the value of the angle of training transmitted to the gun.

2. The correction $\delta$ is transmitted to the conoid 66 which gives the second term of the correction of the angle of site $$\frac{\delta^2}{2}\cos\alpha_0\sin\alpha_0.$$

The fourth member of the crew actuates handle 40 in such a manner that the pointer 37 is maintained opposite 39. This simple operation produces automatically the following results:

1. The correction $\sigma$ is introduced (through 182) in the value of the angle of elevation transmitted to the gun.

2. The correction $\sigma$ is transmitted to the conoids 45, 61 and 106 to the sheet of the graph 88.

The fifth member of the crew actuates handle 86 in such a manner as constantly to maintain the pointer 87 upon the curve corresponding to the height H which is indicated and reads and announces from $t_3$ to $t_3$ seconds the setting of the fuse indicated by the pointer 101.

The operation of the handle 86 produces automatically the following results:

1. The movable brushes 22 and 25 are displaced through an angle which is proportional to $f_2$.

2. The value of $f_2$ is transmitted to the conoid 106 which gives the tangent elevation $h$ and transmits, in its turn, the latter value to the gun by 182.

The sixth member of the crew actuates handle 151 in such a manner as to place the pointer 152 opposite the graduation corresponding to the value which is indicated for the angle $\psi$. He then rotates drums 218, 164 and 178 to suitable positions and actuates handles 162 and 176 in such a manner as to maintain the pointers 163 and 177 upon the curves corresponding to the value which is indicated for W. The latter two operations displace longitudinally, through the desired distance, the wind conoids 166 and 139.

Having now particularly described and ascertained the nature of my said invention, and in what manner the same is to be performed, I declare that what I claim is:—

1. In a fire-control system of the type employing sighting means, and training and elevating means therefor, means operatively connected to said training and elevating means for receiving the angles of elevation and azimuth of the objective from said sighting means, means including conoids operatively connected with said receiving means for determining kinetic corrections for the azimuthal and zenithal velocity of said objective, and wind correction means including conoids operatively connected with said receiving means.

2. In a fire-control system of the type employing sighting means provided with training and elevating means, means operatively connected to said training and elevating means for receiving the angles of elevation and azimuth of the objective from said sighting means, means including a plurality of rheostats and conoids operatively connected with said receiving means for determining kinetic corrections for the azimuthal and zenithal velocity of said objective, wind correction means including a plurality of conoids and manually operable members operatively connected with said receiving means, and means including, rheostats having rotatable contacts operatively connected with said receiving means, kinetic correction means, and wind correction means.

3. In a fire-control system having sighting means and training and elevating means therefor, a movable graph having formed thereon a plurality of time of flight curves and a plurality of fuse setting curves, means including a pair of rollers operatively connecting said graph to said elevating means for moving the graph according to a function of the future angle of sight, indicator means for the time of flight and fuse setting curves, and means including a rotatable handle for maintaining said indicator means on selected curves, said apparatus being located at a distance from said gun.

4. In a fire-control system having sighting means, and training and elevating means therefor, a pair of magnetos actuated by said training and elevating means, movable and fixed brushes for each of said magnetos, means for moving said movable brushes, the movement of said armatures and said brushes being such that the voltage supplied by one of said magnetos is proportional to the time of flight of a projectile fired from said guns and to the azimuthal angular speed of the objective $$f_2\frac{(d\omega)}{dt}$$

and that supplied by the other magneto is proportional to said time of flight and to the zenithal angular speed of the objective $$f_2\frac{(d\alpha)_0}{dt},$$

and having connection with the brushes of said armatures.

5. In a fire-control system having sighting means, and training and elevating means therefor, rheostat means operatively connected to said elevating means, means operatively connected with said rheostat means for introducing a correction proportional to the tangent elevation $h$ considered as a function of the time of flight $f_2$ and the future angle of site $(\alpha_0+\sigma)$ comprising a rotatable conoid mounted for longitudinal movement, means for moving said conoid longitudinally as a function of $f_2$, means for rotating said conoid as a function of $(\alpha_0+\sigma)$, and a movable member engaging the surface of said conoid and operatively connected to said rheostat means.

6. An apparatus for controlling the fire of anti-aircraft guns comprising a graph having fuse-setting curves thereon formed according to a function of the time of flight of a projectile fired from one of said guns $f_2$, and the future angle of site $\alpha+\sigma$, a movable carriage, a tachometer having a pointer mounted on said carriage, and time of flight means connected to said tachometer for displacing said carriage in such a manner that said pointer will occupy a position, relative to one of said curves, corresponding to the duration of flight of the projectile.

7. An apparatus for directing and controlling the fire of anti-aircraft guns comprising a pair of magneto armatures, a pair of movable armature brushes, a pair of arc-shaped rheostats, each of said rheostats having an electrical connection with one of said brushes, a pair of movable contacts, each of said contacts slidably engaging one of said rheostats, a pair of movable rack members, a pair of conoids mounted for longitudinal and rotational movement, means for rotating said conoids according to a function of the initial angle of site $\alpha_0$, means for longitudinally displacing said conoids according to a function of the kinetic correction in site $\sigma$, the movements of said conoids serving to move one of said contacts through an angular distance proportional to $$\frac{\tan(\alpha_0+\sigma)}{\tan\alpha_0}$$

and the other of said contacts through an angular distance proportional to $$\frac{\sin(\alpha_0+\sigma)}{\sin\alpha_0}$$

and a pair of voltmeters electrically connected to said rheostats, the movement of one of said contacts, one of said armatures and one of said brushes being such that the needle of one of said voltmeters is displaced through an angular distance proportional to the time of flight $f_2$, and the azimuthal angular speed of an objective and the movements of the other of said contacts, armatures and brushes displace the needle of the second voltmeter through an angular distance proportional to the time of flight, $f_2$, and the zenithal angular speed of said objective.

8. In an apparatus for controlling the fire of anti-aircraft guns, means for introducing into the angle of site correction the supplementary term $$-\frac{\delta^2}{2}\sin\alpha_0\cos\alpha_0$$

comprising a movably mounted conoid, means for rotating said conoid according to a function of $\alpha_0$, means for longitudinally moving said conoid according to a function of $\delta$, a voltmeter, and a variable zero indicator for said voltmeter actuated by said conoid.

9. In a fire-control system having sighting means and training and elevating means therefor, wind correction means comprising a plurality of drums having scales formed thereon, a pointer for each of said drums, manually operable means for maintaining said pointers and drums in desired relative positions, a pair of movable conoids which are adapted to be displaced longitudinally according to a function of the speed of the wind, the altitude of the target and the angle of site, means for rotating said conoids, in accordance with the direction of the wind, and means operatively connecting said training means to said conoids.

10. In an apparatus for controlling and directing the fire of anti-aircraft guns, means for introducing a correction in the time of flight data made necessary by the wind, comprising a movable pointer, a movable conoid, means for rotating said conoid proportionally to the angle of azimuth, means for longitudinally displacing said conoid according to a function of the speed of the wind, and means interposed between said pointer and said conoid and actuated by the movement of the latter for displacing the pointer through a distance proportional to said correction.

11. In an apparatus for directing and controlling the fire of anti-aircraft guns including a training telescope and an elevating telescope, a pair of magneto armatures, means for rotating said armatures and said telescopes at constant speeds, means for altering said speeds, and means including differential gears for rotating said telescopes without altering the speed of rotation of said armatures.

12. In an apparatus for controlling the fire of anti-aircraft guns, means for obtaining the differential coefficient of the time of flight, $f_2$, regarded as a function of time $t$, comprising two mechanical tachometers, a differential gear positioned between said tachometers, and means connecting said gear and said tachometers in such a manner that the satellites of said gear will be displaced by said tachometers, in amount and in direction, proportionally to the product of the time required for setting the fuse of a projectile to be fired from one of said guns and the speed of variation of the duration of flight.

13. In a fire-control system of the type embodying sighting means and training and elevating means for said sighting means, an armature actuated by said training means, means including a rheostat actuated by said training means proportionally to the azimuthal displacement of the firing objective, an armature actuated by said elevating means, means actuated by said elevating means including a rheostat proportionally to the zenithal displacement of the firing objective, means for introducing into the angles of train and elevation to be transmitted a correction proportional to a function of the kinetic correction in azimuth, said means including a conoid for introducing said correction into the angle of elevation, means including a voltmeter for introducing into the angle of elevation to be transmitted a kinetic correction in elevation, means including a movable pointer for displacing the movable brushes of said armatures proportional to the time of flight and for introducing into the angle of elevation to be transmitted a correction proportional to the tangent elevation and means including conoids for rotating the resistance coils of said rheostats.

14. In a fire-control system having sighting means, and training and elevating means therefor, an armature actuated by said training means, means including a rheostat actuated by said training means for transmitting an indication of the azimuthal displacement of the firing objective, an armature actuated by said elevating means, means actuated by said elevating means, including a rheostat for transmitting an indication of the zenithal displacement of the firing objective, means for introducing into the transmitted angles of train and elevation a correction proportional to a function of the kinetic correction in azimuth, said means including a conoid for introducing said correction into the angle of elevation, means including a voltmeter for introducing into the transmitted angle of elevation a kinetic correction in elevation, means including a movable pointer for displacing the movable brushes of said armatures proportional to the time of flight and for introducing into the transmitted angle of elevation a correction proportional to the tangent elevation, and means including conoids for introducing into the transmitted angles of train and elevation a wind correction.

15. In a fire-control system having sighting means, and training and elevating means therefor, electrical means operatively connected with said training and elevating means, said electrical means including a plurality of rheostats and magnetos having movable contacts, manually operable means for varying the position of said contacts, means for determining fuse-settings, manual means operatively connected to said fuse-setting means, said last named manual means being operatively connected to said electrical means, means for introducing windage corrections, and connecting mechanism for said last named means and said training and elevating means.

16. In a fire-control system having sighting means, and training and elevating means therefor, a plurality of armatures operatively connected to said training and elevating means, movable brushes for said armatures, means for displacing said brushes proportionally to the time of flight of a projectile fired from a gun to be controlled, and correction means for the action of the wind and for the angular velocity of the objective, said last-named means including a plurality of conoids and rheostats operatively connected with said training and elevating means and with said brushes.

17. In a fire control system having a gun provided with indicators which are actuated when the gun is trained and elevated and which is adapted for controlling and directing the fire of said gun against an objective that is assumed to travel in a straight line, at a constant altitude, and at a uniform speed from the moment that a shell is fired from said gun, a corrector located at a distance from said gun, comprising a plurality of armatures, rheostats having connection with the brushes of said armatures, means for varying the effective resistance of said rheostats, a plurality of rheostats having movable resistance coils, means operatively connected with said first named rheostats for moving the contacts of said rheostats having movable coils, and means for rotating said movable resistance coils including manually operable windage correction means.

18. In a fire-control system of the follow-the-pointer type, having sighting means, training means therefor, and a gun provided with indicators at the gun, an armature actuated by said training means proportionally to the azimuthal angular speed of the objective $$\frac{d\omega}{dt},$$

a fixed brush for said armature, a movable brush for said armature, means for displacing said movable brush as a function of the time of flight $f_2$, a voltmeter in circuit with said brushes, a variable resistance in said circuit means for adjusting said resistance proportionally to a function of the angle of site and the kinetic correction of site;

$$\tan\frac{(\alpha_0+\sigma)}{\tan\alpha_0},$$

means for maintaining the needle of said voltmeter at a constant position, a rheostat having movable coils in circuit with said indicators at the gun, said rheostat having a movable contact operatively connected to said last-named means, and means for moving said rheostat coils whereby a correction in deflection is introduced for the action of the wind.

19. In a fire-control system of the follow-the-pointer type, having sighting means, elevating means for said sighting means, and a gun provided with indicators, an armature actuated by said elevating means proportionally to the zenithal angular speed of the objective $$\frac{d\alpha}{dt},$$

a fixed brush for said armature, a movable brush for said armature, means for displacing said movable brush as a function of the time of flight $f_2$, a voltmeter in circuit with said brushes, a variable resistance in said circuit, means for adjusting said resistance proportionally to a function of the angle of site and the kinetic correction of site, $$\sin\frac{(\alpha_0+\sigma)}{\sin\alpha_0},$$

an index for said voltmeter, means for adjusting said index, means for maintaining the pointer of said voltmeter in coincidence with said index, a rheostat having movable coils in circuit with said indicators at the gun, said rheostat having a movable contact operatively connected with said last-named means and said elevating means, means for correcting the movement of said contact for the tangent elevation $h$, and means for moving said rheostat coils thereby introducing a correction in elevation for the action of the wind.

20. In fire control apparatus for anti-aircraft guns of the type embodying telescopic sighting means, means for maintaining the sighting means on a moving objective including a constant speed motor, and means including manually operable members for varying the rate of movement imparted to the sighting means by the constant speed motor.

21. In fire control apparatus for anti-aircraft guns of the type embodying a pair of sighting telescopes, means connecting said telescopes for movement in unison, means for moving said telescopes in accordance with the movement of a target including a constant speed motor, variable speed means for each of said telescopes operatively connected to said motor, and manually operable members for controlling said variable speed means.

22. In apparatus for controlling the fire of anti-aircraft guns of the type embodying telescopic sighting means, means for maintaining the sighting means on a moving objective including a constant speed motor, variable speed transmitting means interposed between the motor and sighting means, and manually operable means for adjusting the variable speed transmitting means, a movable graph, means for moving said graph, a pointer associated with said graph, and a manually operable member for maintaining said pointer on a selected curve of the graph, the movement of the manually operable member being proportional to the time of flight, $f_2$.

23. In fire control apparatus of the type embodying telescopic sighting means, means for maintaining the sighting means on a moving objective including a constant speed motor, a graph, means operatively connected to said second named means for moving said graph, a manually operable member operatively connected to said graph to vary the movement of the latter in accordance with the kinetic correction in sight, a pointer associated with the said graph, and a manually operable member for maintaining said pointer on a selected curve on the graph, the movement of said last-named manually operable member being proportional to the time of flight $f_2$.

24. In fire control apparatus for anti-aircraft guns of the type embodying telescopic sighting means, means for maintaining the sighting means on a moving target including training and elevating mechanisms, a member actuated by the training mechanism according to the azimuthal angular speed of the target $$\frac{d\omega}{dt},$$

a manually operable member adapted to be moved proportionally to the time of flight $f_2$, a manually operable member adapted to be moved proportionally to the kinetic correction in site $\sigma$, means operatively connected to the second-named manually operable member and to the elevating mechanism adapted for movement according to $$\frac{\tan \alpha_0+\sigma}{\tan \alpha_0},$$

$\alpha_0$ being the angle of site, a device adapted to receive a compound movement proportional to the product of the time of flight $f_2$, the azimuthal angular speed $$\frac{d\omega}{dt},$$

and $$\frac{\tan \alpha_0+\sigma}{\tan \alpha_0},$$

and a manually operable member operatively connected with said device for moving the latter in a direction contrary to its normal movement, the movement of the last-named member being proportional to the kinetic correction in direction $\delta$.

25. In fire control apparatus for anti-aircraft guns of the type embodying telescopic sighting means, and means for maintaining the sighting means on a moving target including training mechanism and elevating mechanism, a manually operable member adapted to be moved according to the kinetic correction in direction $\delta$, a manually operable member adapted to be moved according to the kinetic correction in site $\sigma$, a manually operable member adapted to be moved according to the time of flight $f_2$, and means actuated by the training and elevating mechanisms and by the manually operable members including a member having a movement proportionate to the product of the time of flight $f_2$, the azimuthal angular speed of the target $$\frac{d\omega}{dt},$$

and the tangent of the future angle of site divided by the tangent of the angle of site $$\tan \frac{(\alpha_0+\sigma)}{\tan \sigma}$$

26. In apparatus for controlling the fire of anti-aircraft guns of the type embodying telescopic sighting means, and means for maintaining the sighting means on a moving objective including elevating means and training means, a manually operable member adapted to be moved according to the kinetic correction in site $\sigma$; means actuated by the elevating means and by the manually operable member including a graph, and a member having a movement proportional to $$\frac{\sin \alpha_0+\sigma}{\sin \alpha_0},$$

the graph being actuated according to the sum of the angle of site and the kinetic correction in site, $\alpha_0+\sigma$, a pointer associated with said graph, and manually operable means for maintaining the pointer on a selected graph curve, the movement of the manual means for actuating the pointer being proportional to the time of flight $f_2$.

27. In corrector apparatus for controlling the fire of anti-aircraft guns of the type embodying telescopic sighting means, and means including training mechanism and elevating mechanism for maintaining the sighting means on a moving target, graph mechanism including a pair of rollers and a member having curves thereon carried by said rollers, motion transmitting means operatively connecting one of said rollers to the elevating mechanism, a manually operable member coacting with the elevating mechanism for actuating said one of the rollers, a pointer mounted adjacent said member having curves thereon, and a manually operable member for maintaining said pointer on a selected curve, the movement of said last-named member being according to the duration of flight $f_2$.

28. In apparatus for controlling the fire of anti-aircraft guns of the type embodying telescopic sighting means and means including elevating mechanism and training mechanism for maintaining the sighting means on a moving objective, a member operatively connected to the elevating mechanism and moved thereby proportionally to the zenithal angular speed $$\frac{d\alpha}{dt},$$

an element associated with said member, means for moving the element proportionally to the time of flight $f_2$, a manually operable member adapted to be moved according to the kinetic correction in site $\sigma$, and means moved by said manually operable member and said elevating mechanism proportionally to the sine of the future angle of site divided by the sine of the angle of site, $$\frac{\sin \alpha_0+\sigma}{\sin \alpha_0},$$

said last named means being operatively connected to said first named member and said element for coaction therewith.

29. In a fire control system for anti-aircraft guns of the type embodying sighting means, a movable graph having two series of curves, one of said series being graduated in altitudes of the firing objective and giving the duration of future travel $f_2$ as a function of the altitude and of the future site, and the other of said series being graduated in firing ranges giving the said firing range as a function of the duration of travel and of the future site, means for moving said graph as a function of the future angle of site, and index for said first series of curves, a movable member for moving said index, the movement of said member being proportional to the duration of travel $f_2$; a second index for the second series of curves, and means for moving said second index relative to the first by a quantity proportional to the variation of the duration of travel $f_2$ in the unit of time to obtain the firing range from said second series of curves.

30. Apparatus of the type embodying telescopic sighting means, for controlling the fire of one or more guns against an aerial objective that is viewed from an angle of site $\alpha_0$ and which moves in a straight line at a constant speed and at a constant altitude, means operatively connected to said sighting means for determining the kinetic correction in direction $\delta$, to be applied to the gun, where said correction has a value equal to the product of the duration of travel $f_2$ times the tangent of the future angle of site $\alpha_0+\sigma$ divided by the tangent of the angle of site $\alpha_0$ times the azimuthal angular speed, $$\left(\frac{d\omega}{dt}\right)_0$$

of the target, and means for determining the kinetic correction in site $\sigma$ to be applied to said gun, said correction in site having a value corresponding to $$f_2 \frac{\sin (\alpha_0+\sigma)}{\sin \alpha_0} \cdot \left(\frac{d\alpha}{dt}\right)_0 - \frac{\delta^2}{2} \sin \alpha_0 \cos \alpha_0,$$

the above term $$\left(\frac{d\alpha}{dt}\right)_0,$$

being the zenithal angular speed of the target, said first and second named means including tachometers operatively connected to said sighting means for measuring the azimuthal and zenithal angular speeds of the target, and means including a graph associated with said sighting means for determining the duration of travel $f_2$.

31. In a fire control apparatus of the type embodying sighting means provided with training and elevating mechanism, electrical means actuated by said mechanism including a plurality of pointers, manually operable means for maintaining said pointers in predetermined positions to determine the angles of train and elevation when the wind is zero, and apparatus for determining windage correction including means operatively connected to said training mechanism.

32. Fire control apparatus of the type employing sighting means provided with training and elevating mechanism, comprising a manually operable member adapted to be moved proportionally to a kinetic correction in site $\sigma$, a manually operable member adapted to be moved proportionally to a kinetic correction in direction $\delta$, a manually operable member adapted to be actuated proportionally to the time of flight $f_2$, means adapted to be moved proportionally to sin $\delta$ and operatively connected to said training mechanism and said second and third named manually operable members, and means adapted to be moved proportionally to sin $\sigma$ and operatively connected to said elevating mechanism and said first and third named manually operable members.

33. Apparatus of the type embodying sighting means for accurately laying a gun in azimuth to control the fire of the same against an aerial objective which moves in a straight line at a constant speed and a constant altitude, and which has an angle of site $\alpha_0$ comprising a movable element, means operatively connected to said movable element and said sighting means for moving the element in accordance with the angular azimuthal speed of the objective, means including a graph for further moving said element in accordance with the time of flight of a projectile fired from the gun, and means for still further moving said element in accordance with the movement of the sighting means in the zenithal direction to secure a kinetic correction in direction $\delta$ and means including manually operable elements and a member actuated thereby, said member being operatively connected to indicators provided on the gun.

34. Apparatus of the type embodying sighting means for accurately laying a gun in elevation to control the fire of the same against an aerial objective that is observed at an angle of site $\alpha_0$, and that moves in a straight line at a constant speed and at a constant altitude, comprising a movable element, means operatively connected with said movable element and said sighting means for moving the element in accordance with the zenithal movement of the objective, means including a graph for further moving said element in accordance with the time of flight of a projectile, and means including a manually operable member for still further moving said element to secure a kinetic correction in sight $\sigma$ and means including manually operable elements and a member actuated thereby, said member being operatively connected to indicators provided on the gun.

35. Apparatus of the type embodying sighting means for accurately laying a gun to secure hits on an aerial objective having an angle of site $\alpha_0$ and moving in a straight line at a constant speed and at a constant altitude H, comprising means for moving said sighting means in accordance with the movement of said objective, a plurality of manually operable members, apparatus operatively connected to said manually operable members and adapted to be actuated thereby, means operatively connected to said apparatus for combining the movement of the sighting means in azimuth with the movement of said manually operable members to secure a kinetic correction in direction $\delta$ having a valve equal to the product of the time of flight, the azimuthal angular speed of the objective, and the tangent of the future angle of site divided by the tangent of the angle of site, and means for compounding the zenithal movement of the sighting means with the combined movements of said manually operable members to secure a kinetic correction in site $\sigma$ having a value equal to the product of the time of flight, the zenithal angular speed of the objective, and the sine of the future angle of site divided by the sine of the angle of site, minus the half product of the square of the correction in direction $\delta$ by the sine of the angle of site and the cosine of the angle of site.

In testimony whereof I have signed this specification.

EUGÈNE SCHNEIDER.